(12) United States Patent
Jha et al.

(10) Patent No.: US 12,305,828 B2
(45) Date of Patent: May 20, 2025

(54) EXTERIOR AIRCRAFT LIGHT, AIRCRAFT COMPRISING AN EXTERIOR AIRCRAFT LIGHT AND METHOD OF DRAINING A FLUID OUT OF AN EXTERIOR AIRCRAFT LIGHT (71) Applicant: Goodrich Lighting Systems GmbH & Co. KG, Lippstadt (DE)

(72) Inventors: Anil Kumar Jha, Lippstadt (DE); Carsten Pawliczek, Lippstadt (DE)

(73) Assignee: GOODRICH LIGHTING SYSTEMS GMBH & CO. KG, Lippstadt (DE)

( * ) Notice: Subject to any disclaimer, the term of this patent is extended or adjusted under 35 U.S.C. 154(b) by 0 days.

(21) Appl. No.: 18/674,645

(22) Filed: May 24, 2024

(65) Prior Publication Data
US 2024/0418340 A1 Dec. 19, 2024

(30) Foreign Application Priority Data
Jun. 13, 2023 (EP) ..................... 23178965

(51) Int. Cl.
F21S 45/30 (2018.01)
B64D 47/06 (2006.01)

(52) U.S. Cl.
CPC ............. *F21S 45/30* (2018.01); *B64D 47/06* (2013.01)

(58) Field of Classification Search
CPC ........ B64D 47/02; B64D 47/04; B64D 47/06; F16K 15/04; F16K 15/042; F16K 15/044;
(Continued)

(56) References Cited

U.S. PATENT DOCUMENTS 1,270,961 A * 7/1918 Lippert ............... F04B 39/1033
251/284
1,594,168 A 7/1926 Frank
(Continued)

FOREIGN PATENT DOCUMENTS

CA 3004732 11/2018
CN 115597031 A * 1/2023 ............ F21S 41/675
(Continued)

OTHER PUBLICATIONS

European Patent Office; European Search Report dated Oct. 20, 2023 in Application No. 23178965.2.

*Primary Examiner* — Alexander K Garlen
(74) *Attorney, Agent, or Firm* — SNELL & WILMER L.L.P.

(57) ABSTRACT

An exterior aircraft light comprises a housing defining an interior space; a light output generation unit comprising at least one light source; power supply electronics, coupled to the light output generation unit for driving a light output of the exterior aircraft light and a draining device for draining the interior space. At least one of the light output generation unit and the power supply electronics is arranged within the interior space. The draining device comprises a first drainage tube for receiving fluid, a second drainage tube for receiving fluid; and a fluid discharge port for discharging fluid out of the housing. Each of the first and second drainage tubes comprises a valve mechanism for selectively sealing and opening the respective drainage tube with respect to the interior space.

15 Claims, 7 Drawing Sheets (58) Field of Classification Search
CPC ...... F21W 2107/30; F21S 45/30; F21S 45/33; F21S 45/37; F21V 31/03
See application file for complete search history.

(56) References Cited

U.S. PATENT DOCUMENTS

| | | | |
|---|---|---|---|
| 5,251,111 A * | 10/1993 | Nagengast | F21S 45/33 362/547 |
| 6,131,605 A | 10/2000 | Kothe et al. | |
| 6,278,382 B1 | 8/2001 | DeMarco et al. | |
| 10,843,813 B2 | 11/2020 | Ishikiriyama | |
| 2010/0027281 A1 | 2/2010 | Waters et al. | |
| 2011/0255293 A1* | 10/2011 | Lipscomb | F21V 31/03 362/362 |
| 2014/0043844 A1* | 2/2014 | Yang | F21S 45/33 362/547 |

FOREIGN PATENT DOCUMENTS

| | | | |
|---|---|---|---|
| EP | 3626629 | 3/2020 | |
| EP | 4197916 A1 * | 6/2023 | ............ B64D 47/02 |
| JP | H0757512 A * | 3/1995 | ............ F21S 45/33 |

\* cited by examiner

EXTERIOR AIRCRAFT LIGHT, AIRCRAFT COMPRISING AN EXTERIOR AIRCRAFT LIGHT AND METHOD OF DRAINING A FLUID OUT OF AN EXTERIOR AIRCRAFT LIGHT

CROSS-REFERENCE TO RELATED APPLICATIONS

This application claims priority to EP patent application Ser. No. 23/178,965.2, filed Jun. 13, 2023 and titled "EXTERIOR AIRCRAFT LIGHT, AIRCRAFT COMPRISING AN EXTERIOR AIRCRAFT LIGHT AND METHOD OF DRAINING A FLUID OUT OF AN EXTERIOR AIRCRAFT LIGHT," which is incorporated by reference herein in its entirety for all purposes.

FIELD

The present invention relates to aircraft lighting. In particular, the present invention relates to an exterior aircraft light. The present invention further relates to an aircraft comprising such an exterior aircraft light and to a method of draining a fluid out of an exterior aircraft light

BACKGROUND

Almost all aircraft are equipped with numerous lights, including exterior aircraft lights and interior aircraft lights. In particular, large passenger airplanes are provided with a wide variety of exterior and interior aircraft lights.

Exterior aircraft lights are employed for a wide variety of different purposes, such as for allowing the passengers and/or air crew to view the outside, for passive visibility, for signaling purposes, etc. Examples of such exterior aircraft lights are navigation lights, also referred to as position lights, red-flashing beacon lights, white strobe anti-collision lights, wing scan lights, take-off lights, landing lights, taxi lights, runway turn-off lights, etc.

An exterior aircraft light may comprise a housing for accommodating electrical and/or optical components. In operation, fluid, for example condensing water, may collect within the housing. Said water may deteriorate the operation of the exterior aircraft light.

It would therefore be beneficial to provide an exterior aircraft light with a highly effective draining device for draining fluid out of the housing of the exterior aircraft light.

SUMMARY

Exemplary embodiments of the invention include an exterior aircraft light that comprises: a housing defining an interior space; a light output generation unit comprising at least one light source; and power supply electronics, which are coupled to the light output generation unit for driving a light output of the exterior aircraft light. At least one of the light output generation unit and the power supply electronics is arranged within the interior space, defined by the housing.

The exterior aircraft light further comprises a draining device for draining fluid out of the interior space. The draining device comprises: a first drainage tube for receiving fluid, which is to be drained from the interior space; a second drainage tube for receiving fluid, which is to be drained from the interior space; and a fluid discharge port for discharging fluid out of the housing. The fluid discharge port is in fluid communication with the first drainage tube and with the second drainage tube.

Although the first and second drainage tubes are both configured/arranged for receiving fluid, which is to be drained, it is to be noted that the first and second drainage tubes are not configured/arranged for receiving the fluid simultaneously. Instead, depending on the spatial orientation of the exterior aircraft light, only one of the first and second drainage tubes will receive fluid. This will be explained in more detail below.

Each of the first drainage tube and the second drainage tube comprises a valve mechanism for selectively sealing and opening the respective drainage tube with respect to the interior space. Each valve mechanism comprises a valve portion of the respective drainage tube and a sealing element, in particular a sealing ball, arranged in the valve portion of the respective drainage tube. The sealing element is movable in the valve portion under the influence of gravity.

The valve portion and the sealing element are shaped and dimensioned such that the sealing element, driven by gravity, opens the respective drainage tube and allows fluid to pass through, when the respective drainage tube is oriented in a draining orientation. The valve portion and the sealing element are further shaped and dimensioned such that the sealing element, driven by gravity, seals the respective drainage tube in an air-tight manner, when the respective drainage tube is oriented in a sealing orientation Exemplary embodiments of the invention also include a method of draining a fluid out of the interior space of the housing of an exterior aircraft light according to an exemplary embodiment of the invention, with the exterior aircraft light being mounted to an aircraft in a first mounting orientation. When the exterior aircraft light is mounted in the first mounting orientation to the aircraft, the first drainage tube extends in a draining orientation into a low portion of the interior space. The second drainage tube is in its sealing orientation. The method comprises the steps of: when the aircraft is on the ground, with gravity acting upon the sealing elements, opening the valve mechanism of the first drainage tube and closing the valve mechanism of the second drainage tube; taking off the aircraft and gaining altitude; with a pressure difference between the interior space of the housing and an outside environment of the aircraft, driving the fluid through the valve mechanism of the first drainage tube and out of the housing. When the exterior aircraft light is mounted in the second mounting orientation to the aircraft, the second drainage tube extends in a draining orientation into a low portion of the interior space and the first drainage tube is in its sealing orientation. The method steps may then be carried out with the first and second drainage tubes being swapped.

In a draining device of an exterior aircraft light according to an exemplary embodiment of the invention, the valve mechanism of that drainage tube that extends downwards in the draining orientation is unsealed/opened by gravity, whereas the valve mechanism of the other drainage tube, which is extending upwards in the sealing orientation is sealed by gravity in an air-tight manner. The drainage tube with the unsealed/opened valve mechanism may be immersed in fluid, collected at a low portion of the interior space, and may drain said fluid out of the interior space, while the drainage tube with the sealed valve mechanism extends into an upper portion of the interior space and is not immersed in the fluid.

In case of a pressure difference between the interior space and the fluid discharge port, the sealed valve mechanism, i.e. the valve mechanism of that drainage tube that extends upwards in the sealing orientation and that is not immersed in the fluid, prevents the pressure from equalizing through the drainage tube that is not immersed in the fluid. In consequence, the pressure difference may equalize only through the other drainage tube, i.e. through that drainage tube that extends downwards in the draining orientation and that is immersed in the fluid. As a result, the pressure difference between the interior space and the fluid discharge port drives the fluid out of the interior space via that drainage tube that extends downwards and that is immersed in the fluid.

The fluid discharge port may in particular be in fluid communication with the exterior of the aircraft. This may cause a decrease of the pressure within the fluid discharge port and the drainage tubes of the draining device, when the aircraft is gaining altitude. Thus, the rise of the aircraft after take-off may generate a pressure difference between the interior space and the fluid discharge port that acts as a driving force for draining the fluid out of the interior space.

The draining device of an exterior aircraft light according to an exemplary embodiment of the invention may effectively and reliably drain fluid, such as condensing water, out of the interior space of the housing of the exterior aircraft light, without the need for providing a mechanical pumping mechanism. The draining device may be an entirely passive draining device. The actuation of the draining device may take place via the pressure conditions present during the flight of the aircraft. The draining device of an exterior aircraft light according to an exemplary embodiment of the invention may comprise only two movable parts, namely the movable sealing elements. It may therefore be easy to produce and it may not need extensive maintenance. The draining device of an exterior aircraft light according to an exemplary embodiment of the invention is very reliable, as it is operable without being connected to a power source.

In an embodiment, the draining orientation is a downward orientation, in which the respective drainage tube extends from the fluid discharge port into a low portion of the interior space. Such an orientation of the drainage tube allows for draining fluid that is collected in a low portion of the interior space, in particular at the bottom of the interior space.

In an embodiment, the sealing orientation is an upward orientation, in which the respective drainage tube extends from the fluid discharge port into an upper portion of the interior space. A drainage tube that extends from the fluid discharge port into an upper portion of the interior space is not immersed within fluid collecting in a low portion of the interior space. This drainage tube is sealed in an air-tight manner, in order to prevent air from leaving the interior space via the drainage tube that extends into an upper portion of the interior space, without driving fluid out of the interior space.

In an embodiment, the first drainage tube and the second drainage tube are oriented at an angle of between 150° and 180° with respect to each other. The first drainage tube and the second drainage tube may in particular oriented at an angle of between 170° and 180° with respect to each other. An angle of between 150° and 180°, in particular an angle of between 170° and 180°, between the two drainage tubes allows for the sealing elements to be moved simultaneously and highly reliably by gravity into their respective positions for opening the valve mechanism of the drainage tube that is oriented in the draining orientation and for sealing the valve mechanism of the drainage tube that is oriented in the sealing orientation.

In an embodiment, for at least one the first drainage tube and the second drainage tube, in particular for both of the first drainage tube and the second drainage tube, the valve portion comprises a radially extended portion with a diameter of the radially extended portion being larger than a diameter of the rest of the respective drainage tube. A radially extended portion having a larger diameter than the respective drainage tube may provide a sealing element accommodation space for accommodating the sealing element. In said sealing element accommodation space, the sealing element may be movable, in particular by gravity, between an open position, in which it opens the valve mechanism of the drainage tube when oriented in the draining orientation, and a sealing position, in which it seals the valve mechanism of the drainage tube when oriented in the sealing orientation.

In an embodiment, the valve portions of all drainage tubes of the draining device comprise a respective radially extended portion.

In an embodiment, for at least one the first drainage tube and the second drainage tube, in particular for both of the first drainage tube and the second drainage tube, the valve portion comprises an inner conical portion having a conical shape. In an embodiment, the valve portions of all drainage tubes of the draining device comprise a respective inner conical portion. The inner conical portion may in particular be shaped and dimensioned for accommodating the sealing element in such a manner that it seals the drainage tube in an air-tight manner, when the respective drainage tube is oriented in the sealing orientation. The inner conical portion may act as an effective and easily implementable means for achieving the sealing of the valve mechanism in question.

In an embodiment, the wall of the conical portion is inclined at an angle of between 35° and 45° with respect to the longitudinal extension of the drainage tube. An angle in the range of between 35° and 45° has been found to be well suited for allowing the sealing element to reliably seal the drainage tube in an air-tight manner, when the respective drainage tube is oriented in the sealing orientation.

In an embodiment, for at least one the first drainage tube and the second drainage tube, in particular for both of the first drainage tube and the second drainage tube, the valve portion comprises an outer conical portion having a conical shape. In an embodiment, the valve portions of all drainage tubes of the draining device comprise a respective outer conical portion. The outer conical portion may have a central opening or may be closed towards the end of the respective drainage tube. The outer conical portion may be dimensioned such that the outer conical portion acts as a retainer, preventing the sealing element from dropping out of the valve portion, when the respective drainage tube is oriented in the draining orientation. The outer conical portion may act as an effective and easily implementable means for achieving a retaining of the sealing element in the valve mechanism in question.

In an embodiment, the inner conical portion and the outer conical portion of the respective valve portion face each other. In particular, the inner conical portion and the outer conical portion may be funnel-like structures, whose more extended ends face each other. The inner conical portion and the outer conical portion may form the sealing element accommodation space, wherein the sealing element is movable within the sealing element accommodation space, formed between the inner and outer conical portions.

In an embodiment, an intermediate portion, in particular a cylindrical intermediate portion, extends between the inner conical portion and the outer conical portion. An intermediate portion, extending between the inner conical portion and the outer conical portion, may enlarge the sealing element accommodation space, allowing more movement of the sealing element within the sealing element accommodation space. Hence, more flexibility regarding the design of further opening and sealing features, such as the drainage port(s) described below, may be achieved.

In an embodiment, at least one drainage port is formed in the valve portion. The at least one drainage port may in particular be formed in an outer conical portion and/or in an intermediate portion of the valve portion. The at least one drainage port may provide for fluid communication between the interior space of the housing and the respective drainage tube, when the respective drainage tube is oriented in the draining orientation.

In an embodiment, a plurality of drainage ports are formed along the circumference of the valve portion. The plurality of drainage ports may in particular be formed at equal angular distances with respect to each other along the circumference of the valve portion.

In an embodiment, the at least one drainage port in provided in the form of at least one longitudinal slit. The longitudinal slit(s) may in particular be formed in an outer conical portion of the valve portion. It/they may extend into the intermediate portion of the valve portion. Such longitudinal slit(s) may provide for fluid communication between the interior space and the respective drainage tube, when the respective drainage tube is oriented in the draining orientation. The longitudinal slit(s) may provide for effective and easily implementable means for achieving fluid communication between the interior space and the respective drainage tube. The longitudinal slit(s) may further allow the outer conical portion to elastically expand in the radial direction, when the sealing element is arranged within the outer conical portion.

The at least one longitudinal slit may or may not extend from an outer end of the drainage tube. The at least one longitudinal slit may in particular extend from a central opening that is formed in an outer conical portion of the valve portion.

In an embodiment, the at least one drainage port includes at least one drainage hole. Such drainage hole(s) may be formed in the outer conical portion and/or in the intermediate portion of the valve portion.

In an embodiment, for at least one the first drainage tube and the second drainage tube, in particular for both of the first drainage tube and the second drainage tube, the drainage tube has an inner diameter in the range of between 2 mm and 10 mm, in particular an inner diameter in the range of between 4 mm and 6 mm, more particularly an inner diameter of about 5 mm.

In an embodiment, for at least one the first drainage tube and the second drainage tube, in particular for both of the first drainage tube and the second drainage tube, the radially extended valve portion has a maximum inner diameter in the range of between 5 mm and 20 mm, in particular a maximum inner diameter in the range of between 10 mm and 15 mm.

In an embodiment, for at least one the first drainage tube and the second drainage tube, in particular for both of the first drainage tube and the second drainage tube, the sealing element of the valve mechanism has an outer diameter in the range of between 4 mm and 15 mm, in particular an outer diameter in the range of between 6 mm and 10 mm, more particularly an outer diameter of about 8 mm.

In an embodiment, for at least one the first drainage tube and the second drainage tube, in particular for both of the first drainage tube and the second drainage tube, the sealing element of the valve mechanism has a weight in the range of between 3 g and 15 g, in particular a weight in the range of between 8 g and 12 g, more particularly a weight of about 10 g.

Such dimensions/properties of the drainage tubes and the sealing elements have been found to be well suited for reliably sealing a drainage tube in an air-tight manner, when the drainage tube is oriented in the sealing orientation, and for allowing a sufficient amount of fluid to pass through a drainage tube that is oriented in the draining orientation.

In an embodiment, the sealing element comprises a metal ball. A metal ball has been found to provide a suitable sealing element, which reliably seals the drainage tube in an air-tight manner, when the drainage tube is arranged in the sealing orientation. Also, a metal ball can be reliably produced with suitable accuracy for achieving a reliable sealing of the valve mechanism.

In an embodiment, the sealing element comprises a metal ball that is covered with an elastic coating, in particular with a rubber coating. An elastic coating, such as a rubber coating, may enhance the sealing capabilities of the sealing element.

In an embodiment, the sealing element comprises a ball portion and a rod portion, extending from the ball portion. The rod portion may in particular extend from the ball portion in a radial direction.

In an embodiment, the rod portion extends into a respective drainage tube, when the sealing element is arranged within the valve portion of the respective drainage tube. In such a configuration, the rod portion may guide the movement of the sealing element between a sealing position and an open position. Also, the rod portion may provide convenient and effective means of increasing the weight of the sealing element, thus contributing to an effective and reliable sealing of the valve mechanism, when the drainage tube is in the sealing orientation.

In an embodiment, the ball portion and the rod portion of the sealing element are formed integrally. Such an integrally formed sealing element may be manufactured in a cost-efficient manner in a single manufacturing process.

In an embodiment, the rod portion and the ball portion are manufactured separately and are then joined with each other. The rod portion may, for example, be glued, soldered or welded to the ball portion.

In an embodiment, the ball portion and the rod portion are provided with matching threads, in order to allow for screwing the rod portion to the ball portion for securely joining the rod portion and the ball portion.

The ball portion and the rod portion may comprise materials that may include metal, rubber and/or synthetic materials.

In an embodiment, the ball portion and the rod portion comprise the same material. In another embodiment, the ball portion and the rod portion are made from different materials.

In an embodiment, at least one of the ball portion and the rod portion is at least partially coated with a coating for enhancing the sealing capabilities of the sealing element. The coating may comprise rubber or another elastic material, in particular an elastic synthetic material.

In an embodiment, the valve mechanism is arranged at an outer end portion of the respective drainage tube.

In an embodiment, the fluid discharge port comprises a discharge tube. The discharge tube may in particular be oriented substantially orthogonal to the first drainage tube and/or to the second drainage tube. The discharge tube may be in fluid communication with the outer environment of the aircraft. The discharge tube may be in fluid communication with a conduit or hose that is in turn in fluid communication with the outer environment of the aircraft.

In an embodiment, the discharge tube, the first drainage tube and the second drainage tube extend in a common plane.

In an alternative embodiment, the discharge tube, the first drainage tube and the second drainage tube do not extend in a common plane.

The geometries and the spatial orientations of the discharge tube, the first drainage tube and the second drainage tube may in particular depend on the potential mounting orientations in which the exterior aircraft light may be mounted to the aircraft.

In an embodiment, the exterior aircraft light is mountable to an aircraft in a first mounting orientation and in a second mounting orientation. When the exterior aircraft light is in the first mounting orientation, the first drainage tube extends into a first portion of the interior space for receiving fluid from the first portion of the interior space, with the first portion being a low portion of the interior space. In this scenario, the first drainage tube is in its draining orientation and the second drainage tube is in its sealing orientation. When the exterior aircraft light is in the second mounting orientation, the second drainage tube extends into a second portion of the interior space for receiving fluid from the second portion of the interior space, with the second portion being a low portion of the interior space. In this scenario, the second drainage tube is in its draining orientation and the first drainage tube is in its sealing orientation.

For exterior aircraft lights according to exemplary embodiments of the invention, the same type of exterior aircraft light may be mounted to an aircraft in at least two different mounting orientations. The particular mounting orientation may be chosen depending on the desired position of the exterior aircraft light in the aircraft frame of reference and/or on the particular type of aircraft. As a result, the total number of different exterior aircraft lights that are required for equipping an aircraft/an aircraft fleet with a complete set of exterior aircraft lights may be reduced. In consequence, the efforts and costs for equipping an aircraft/an aircraft fleet with a complete set of exterior aircraft lights may be reduced as well.

In an embodiment, the exterior aircraft light is an aircraft headlight, for example an aircraft landing light or an aircraft take-off light or an aircraft taxi light or an aircraft runway turn-off light, or a multi-functional aircraft headlight, which combines the functionalities of any two or any three or all of an aircraft landing light, an aircraft take-off light, an aircraft taxi light, and an aircraft runway turn-off light. An aircraft headlight according to an exemplary embodiment of the invention may be configured such that it can be mounted to an aircraft running gear in at least two different orientations.

In an embodiment, the exterior aircraft light is an aircraft navigation light, in particular a wing-tip-mounted aircraft navigation light. An aircraft navigation light according to an exemplary embodiment of the invention may be configured such that it can be mounted to a left wing tip or to a right wing tip of an aircraft. The orientation of the aircraft navigation light, when mounted to the left wing tip of the aircraft, may be different from the orientation of the aircraft navigation light, when mounted to the right wing tip of the aircraft. In particular, the two mounting orientations may differ by 180°.

In an embodiment, the exterior aircraft is a red-flashing aircraft beacon light, in particular a fuselage-mounted red-flashing aircraft beacon light. A red-flashing aircraft beacon light according to an exemplary embodiment of the invention may be configured such that it can be mounted to a top portion or to a bottom portion of an aircraft fuselage. The two mounting orientations may differ by 180°.

In an embodiment, the light output generation unit and the power supply electronics are both arranged within the housing. Such an embodiment may provide for a compact exterior aircraft light in which many or all important components of the exterior aircraft light are arranged in a single housing.

In an embodiment, the power supply electronics are arranged in the housing and the light output generation unit is arranged in a separate light head portion of the exterior aircraft light, which is arranged outside of the housing. Such an embodiment may provide for an exterior aircraft light in which the light head portion may be positioned and installed independently of the housing. This may provide a high degree of flexibility regarding the installation of the exterior aircraft light.

Exemplary embodiments of the invention further include an aircraft, such as an airplane or a helicopter, that is equipped with at least one exterior aircraft light according to an exemplary embodiment of the invention. The additional features, modifications and effects, as described above with respect to an exterior aircraft light in accordance with exemplary embodiments of the invention, apply to the aircraft in an analogous manner.

BRIEF DESCRIPTION OF THE DRAWINGS

Further exemplary embodiments of the invention are described below with respect to the accompanying drawings, wherein.

DETAILED DESCRIPTION

Figure 1A:
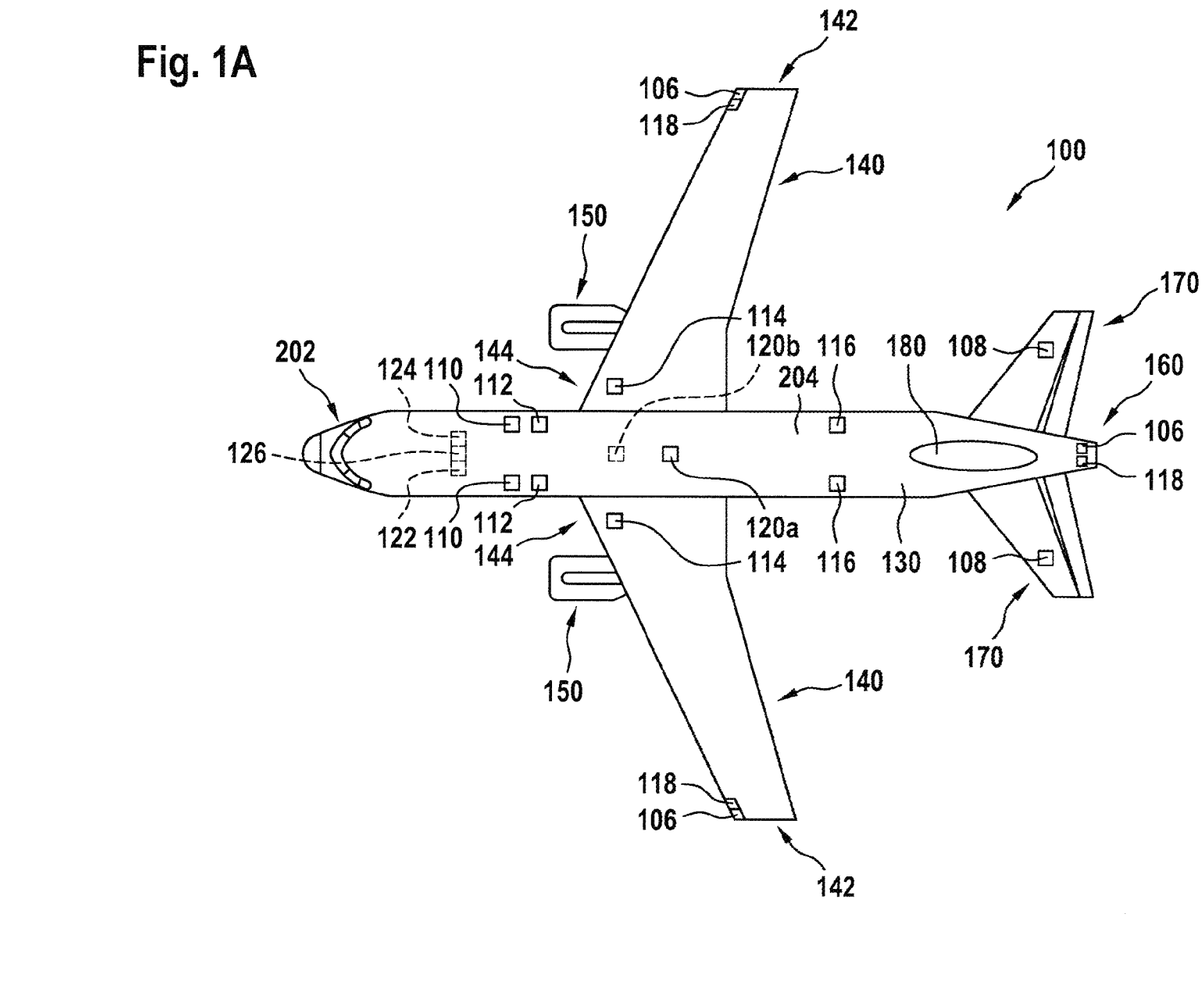
FIG. 1A shows a schematic top view of an aircraft according to an exemplary embodiment of the invention, which is equipped with a variety of exterior aircraft lights.
Figure 1B:
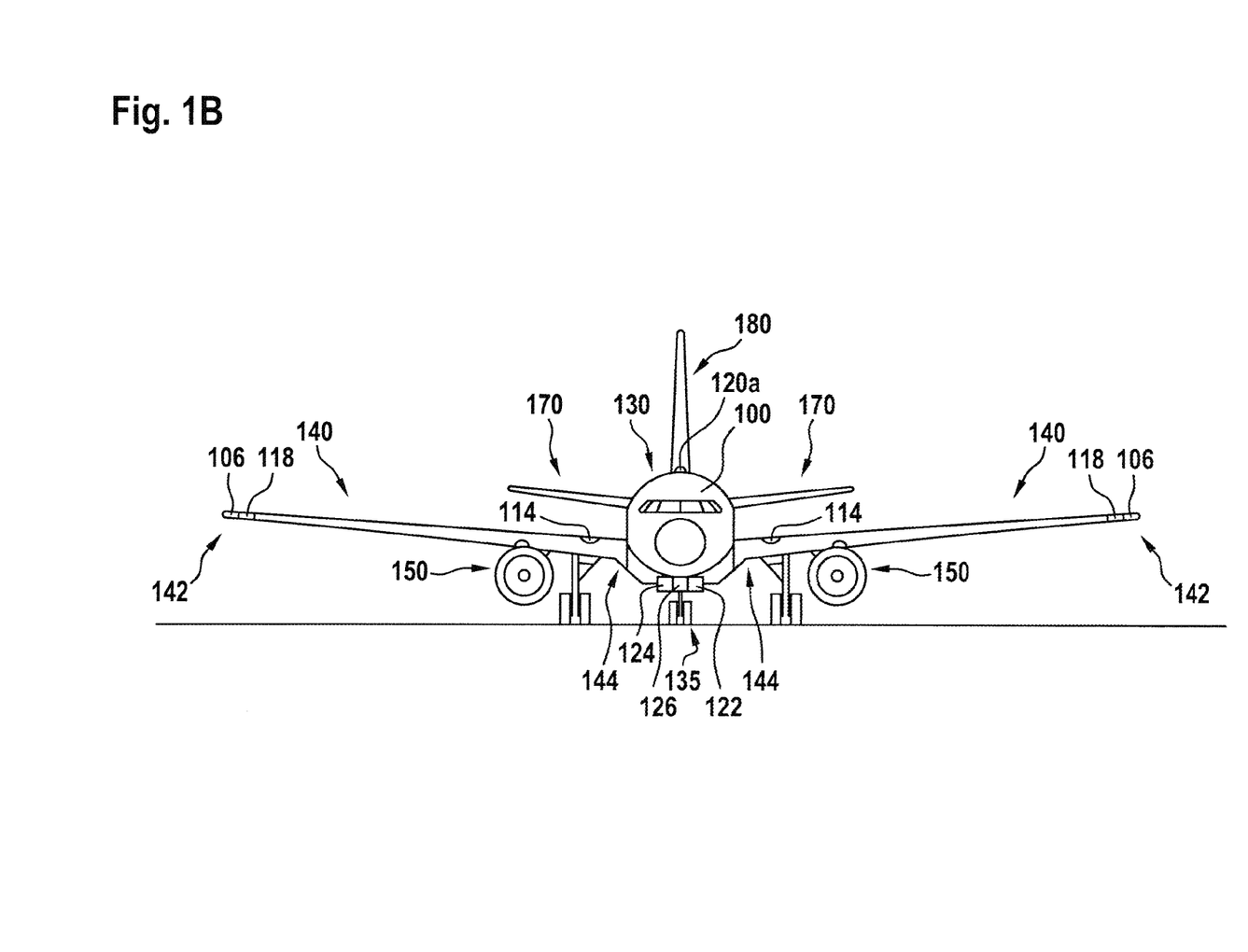
FIG. 1B shows a schematic front view of the aircraft shown in FIG. 1A.

FIGS. 1A and 1B, jointly also referred to as FIG. 1 herein, show an aircraft 100, in particular an airplane, comprising a fuselage 130, which houses a cockpit 202 and a passenger cabin 204, and two wings 140, extending from the fuselage 130. Two horizontal stabilizers 170 and a vertical stabilizer 180 extend from a rear portion of the fuselage 130. An engine 150 is mounted to each of the wings 140, respectively. The aircraft 100 is shown in a top view in FIG. 1A and shown in a front view in FIG. 1B.

The aircraft 100 of FIG. 1 is equipped with a wide variety of exterior lights. In particular, the aircraft 100 is equipped with three navigation lights 106, two logo lights 108, two wing scan lights 110, two engine scan lights 112, two runway turn-off lights 114, two cargo loading lights 116, three white anti-collision strobe lights 118, two red-flashing anti-collision beacon lights 120a, 120b, a landing light 122, a take-off light 124 and a taxi light 126. It is pointed out that these kinds of lights and their numbers are exemplary only and that the aircraft 100 may be equipped with additional lights that are not shown.

The three navigation lights 106 are positioned in the left and right wing tips 142 as well as at the tail 160 of the aircraft 100. In normal flight conditions, each one of the navigation lights 106 emits light in one of the colors green, red and white, thus indicating to the aircraft environment if they are looking at the port side, starboard side or tail side of the aircraft. The navigation lights 106 are normally on during all phases of the flight and in all flight conditions.

The logo lights 108 are directed to the vertical stabilizer 180 of the aircraft 100 and are provided for illuminating the same, in particular for illuminating the logo commonly provided on the vertical stabilizer 180. The logo lights 108 are normally switched on for the entire duration of the flight during night flights. It is also possible that the logo lights are only used during taxiing on the airport and are normally switched off during the flight.

The wing scan lights 110 and the engine scan lights 112 are positioned on the left and right sides of the fuselage 130, in front of the roots 144 of the wings 140 of the aircraft 100. The wing scan lights 110 and the engine scan lights 112 are normally off during the flight and may be switched on periodically or upon reasonable cause by the pilots or by the aircrew, in order to check the wings 140 and the engines 150 of the aircraft 100.

The runway turn-off lights 114 are positioned in the roots 144 of the wings 140. The runway turn-off lights 114 are directed forwards and are normally switched off during the flight and switched on during taxiing, at least at night.

The cargo loading lights 116 are positioned on the left and right sides of the fuselage 130, behind the wings 140 and in front of the tail structure of the aircraft 100. They are normally switched off during the flight of the aircraft 100.

The white anti-collision strobe lights 118 are positioned in the left and right wing tips 142 as well as at the tail 160 of the aircraft 100. The white anti-collision strobe lights 118 emit respective sequences of white light flashes during normal operation of the aircraft 100. It is also possible that the white anti-collision strobe lights 118 are only operated during night and in bad weather conditions.

A first red-flashing anti-collision beacon light 120a is positioned on the top of the fuselage 130 of the aircraft 100, and a second red-flashing anti-collision beacon light 120b is positioned at the bottom of the fuselage 130 of the aircraft 100. The second red-flashing anti-collision beacon light 120b, disposed on the bottom of the fuselage 130, is shown in phantom in FIG. 1A.

The first and second red-flashing anti-collision beacon lights 120a, 120b are arranged at the height of the wings in the longitudinal direction of the aircraft 100. The red-flashing anti-collision beacon lights 120a, 120b are normally switched on during taxiing and during take-off and landing. Their output is perceived as a sequence of red light flashes in a given viewing direction.

In the embodiment depicted in FIG. 1, the runway turn-off lights 114 are located in the wings 140, in particular in the roots 144 of the wings 140, and the landing light 122, the take-off light 124 and the taxi light 126 are mounted to the front gear 135 of the aircraft 100. The front gear 135 is stored within the fuselage 130 of the aircraft 100 during flight, and it is deployed during landing, taxiing and take off.

In alternative embodiments, which are not explicitly shown in the figures, the runway turn-off lights 114 may be mounted to the front gear 135 and/or at least one of the landing light 122, the take-off light 124 and the taxi light 126 may be installed in the wings 140, in particular in the roots 144 of the wings 140, of the aircraft 100.

The aircraft 100 may also comprise one or more multi-functional lights, which combine(s) the functionalities of at least two of a landing light, a take-off light, a taxi light, and a runway turn-off light.

Since the landing light 122, the take-off light 124, and the taxi light 126 are arranged on the bottom of the aircraft 100, they are also depicted in phantom in FIG. 1A.

Each of these exterior aircraft lights may be an exterior aircraft light according to an exemplary embodiment of the invention. In particular, those ones of the depicted exterior aircraft lights where a single type/design of exterior aircraft light may be mounted to the aircraft in different orientations and/or at different mounting positions may largely benefit from the implementation in accordance with exemplary embodiments of the invention. Exemplary embodiments of the invention may for example be provided for the landing light 122, the take-off light 124, the taxi light 126, the runway turn-off lights 114, the navigation lights 106 at the left and right wing tips, and the red-flashing anti-collision beacon lights 120a, 120b. For example, a single type of navigation light that is capable of selectively emitting a green navigation light output or a red navigation light output may be used both as the right wing-tip navigation light and the left wing-tip navigation light. As a further example, a single type of red-flashing beacon light may be used both as the upper red-flashing beacon light and as the lower red-flashing beacon light. When equipped with one or more exterior aircraft lights in accordance with exemplary embodiments of the invention, the aircraft 100 is an aircraft in accordance with an exemplary embodiment of the invention.

At least some of the exterior aircraft lights depicted in FIG. 1 may be mounted in different orientations to the aircraft 100. In other words, the same type of exterior aircraft light may be mounted in at least two different orientations and/or at different positions of the aircraft 100.

Figure 2:
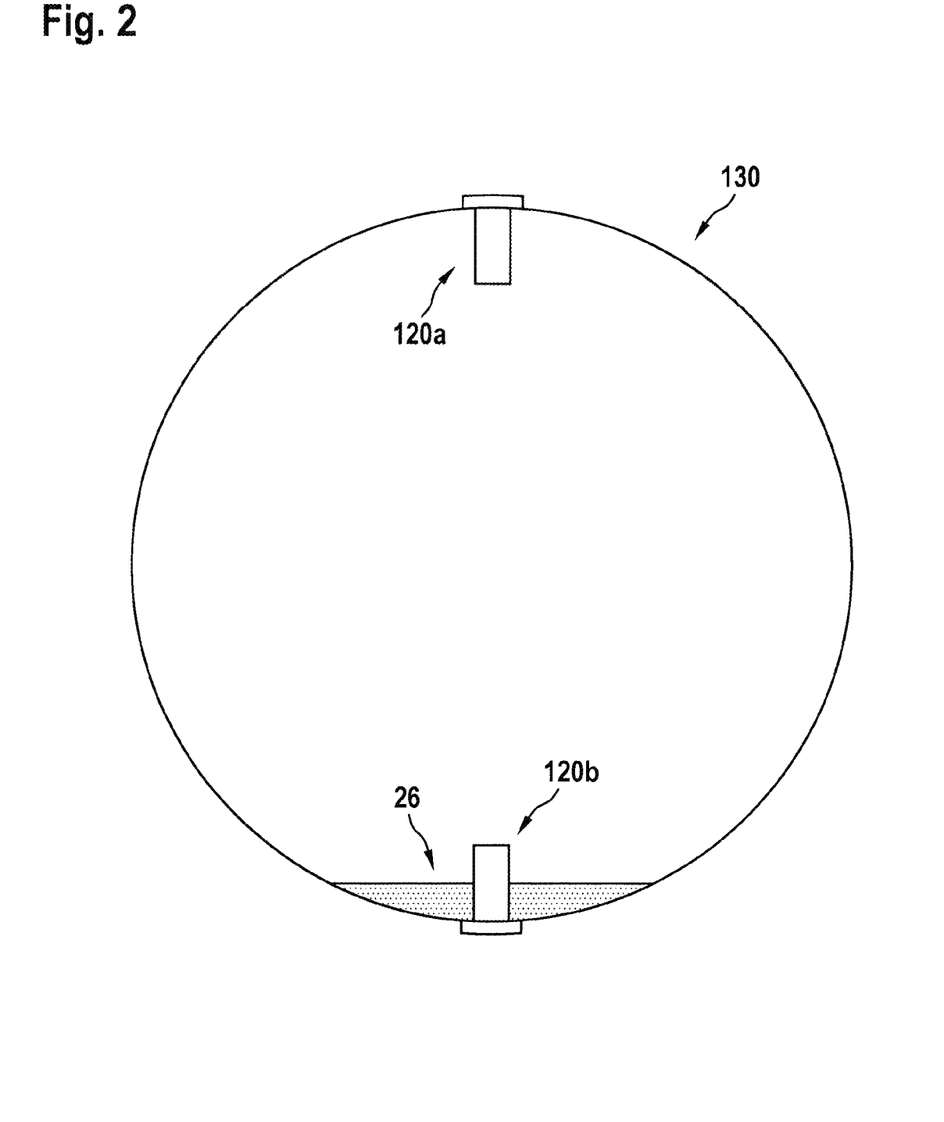
FIG. 2 shows a schematic cross-sectional view of the fuselage of an aircraft that is equipped with two exterior aircraft lights according to exemplary embodiments of the invention.

As an example, FIG. 2 shows a schematic cross-sectional view of the fuselage 130 of an aircraft 100 that is equipped with two red-flashing anti-collision beacon lights 120a, 120b.

A first red-flashing anti-collision beacon light 120a is mounted to a top portion of the fuselage 130, and a second red-flashing anti-collision beacon light 120b is mounted to a bottom portion of the fuselage 130.

The first red-flashing anti-collision beacon light 120a and the second red-flashing anti-collision beacon light 120b may have the same structure/design, i.e. the first red-flashing anti-collision beacon light 120a and the second red-flashing anti-collision beacon light 120b may be identical apart from being mounted to the fuselage 130 of the aircraft 100 in an upside-down orientation with respect to each other.

Fluid 26, which may in particular be condensing water admixed with dirt, may collect at the bottom of the fuselage 130. This fluid may penetrate into the second red-flashing anti-collision beacon light 120b. As mentioned, it is desirable to drain this fluid 26 out of the second red-flashing anti-collision beacon light 120b.

Although two red-flashing anti-collision beacon lights 120a, 120b are shown as an example in FIG. 2, the problem of fluid 26 collecting within the exterior aircraft light may similarly apply to other types of exterior aircraft lights as well.

Such exterior aircraft lights may in particular include aircraft headlights, for example aircraft landing lights and aircraft take-off lights, aircraft taxi lights, an aircraft runway turn-off lights, and multi-functional aircraft headlights, which combine the functionalities of at least two of an aircraft landing light, an aircraft take-off light, an aircraft taxi light, and an aircraft runway turn-off light, as they are depicted in FIG. 1.

Exterior aircraft lights according to exemplary embodiments of the invention may further include aircraft navigation lights, in particular wing-tip-mounted aircraft navigation lights, as they are depicted in FIG. 1.

Figure 3A:
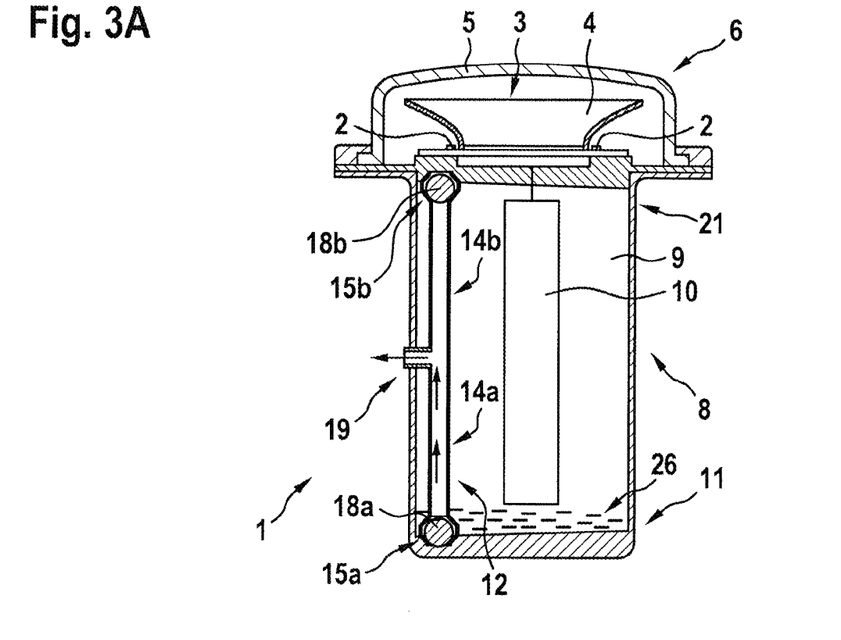
FIG. 3A shows an exterior aircraft light according to an exemplary embodiment of the invention in a first orientation.
Figure 3B:
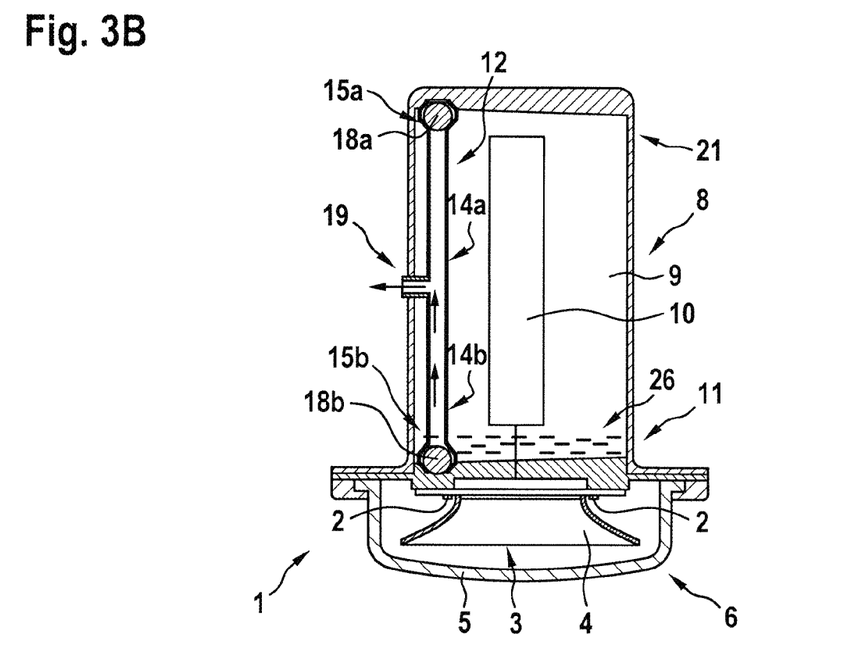
FIG. 3B shows the exterior aircraft light of FIG. 3A in a second orientation.

FIGS. 3A and 3B, jointly also referred to as FIG. 3 herein, show an exterior aircraft light 1 according to an exemplary embodiment of the invention.

FIG. 3A depicts the exterior aircraft light 1 in a first orientation, which may be called an upside orientation, and which may correspond to the exterior aircraft light 1 being mounted to the top of the fuselage 130 of an aircraft 100, as it is depicted for the first red-flashing anti-collision beacon light 120a in FIG. 2.

FIG. 3B depicts the exterior aircraft light 1 in a second orientation, which may be called a downside orientation, and which may correspond to the exterior aircraft light 1 being mounted to the bottom of the fuselage 130 of an aircraft 100, as it is depicted for the second red-flashing anti-collision beacon light 120b in FIG. 2.

In FIG. 3, the red-flashing anti-collision beacon lights are depicted only as examples. FIG. 3 does not restrict exterior aircraft lights according to exemplary embodiments of the invention to such red-flashing anti-collision beacon lights 120a, 120b. Instead, the principles of draining water out of the exterior aircraft light, as described in the following, may similarly apply to other types of exterior aircraft lights as well.

The exterior aircraft light 1 depicted in FIG. 3 comprises a light output generation unit 3 for generating a light output of the exterior aircraft light 1. The light output generation unit 3 comprises at least one light source 2, in particular a plurality of light sources 2, for example a plurality of LEDs, and at least one optical element 4, in particular a reflector 4, which is shaped for forming the light output of the exterior aircraft light 1 from the light that is emitted by the at least one light source 2.

Although not explicitly shown in FIG. 3, the light output generation unit 3 may comprise at least one further optical element, such as a lens, a prism, a shutter, and/or a further reflector, in addition to or as an alternative to the reflector 4 depicted in FIG. 3.

The plurality of light sources 2 and the optical element 4 are enclosed by a light transmissive cover 5, which protects the light output generation unit 3 from adverse external influences, and which allows the light emitted by the plurality of light sources 2 to pass through for providing the light output of the exterior aircraft light 1.

The exterior aircraft light 1 further comprises a housing 8 defining an interior space 9 that houses power supply electronics 10. The power supply electronics 10 are electrically coupled to the plurality of light sources 2 of the light output generation unit 3 for driving and controlling the operation of the plurality of light sources 2.

In the embodiment depicted in FIG. 3, the light output generation unit 3 is located in a light head portion 6, which is located outside of the housing 8. In further embodiments, which are not explicitly shown in the figures, the light output generation unit 3 may be located inside the housing 8. In other words, the housing 8 may be a larger housing and may be a joint housing for the light output generation unit 3 and the power supply electronics 10.

As depicted in FIG. 3, fluid 26, which may in particular be condensing water, potentially admixed with dirt, exhaust residues, atmospheric particles, etc., may collect in a low portion 11 of the interior space 9. Depending on the orientation, in which the exterior aircraft light 1 is mounted to the aircraft 100, the low portion 11 of the interior space 9 may be on the side of the housing 8 opposite to the light output generation unit 3, as depicted in FIG. 3A. Alternatively, the low portion 11 of the interior space 9 may on be the side of the housing 8 next to the light output generation unit 3, as it is depicted in FIG. 3B.

The exterior aircraft light 1 is equipped with a draining device 12 for draining the fluid 26, collected within the respective low portion 11 of the interior space 9, irrespective of the orientation in which the exterior aircraft light 1 is mounted to the aircraft 100, i.e. irrespective of whether the exterior aircraft light 1 is mounted to the aircraft 100 in the upside orientation depicted in FIG. 3A, or in the downside orientation depicted in FIG. 3B.

Figure 4A:
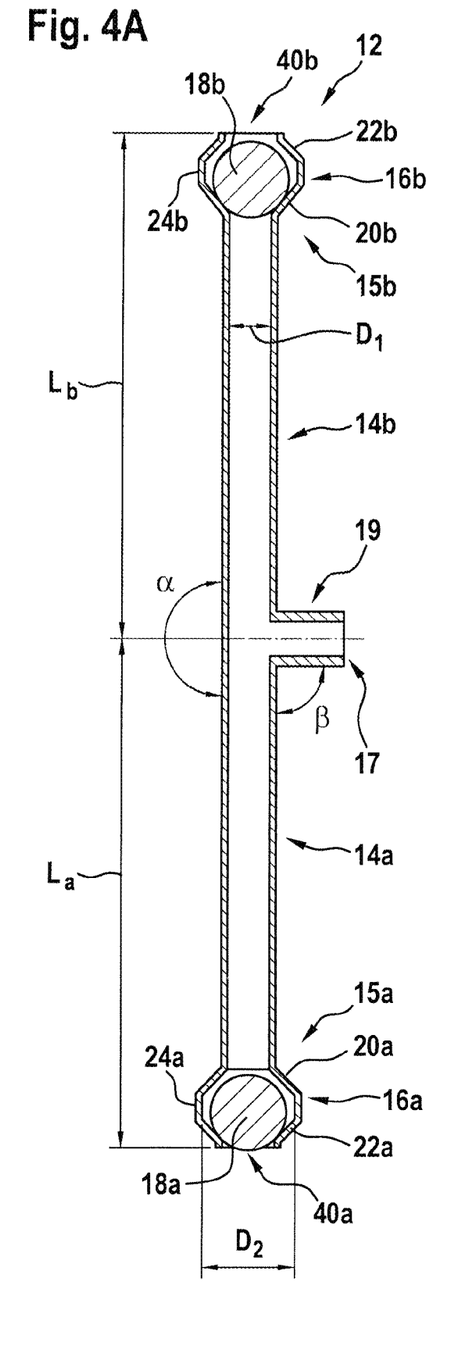
FIG. 4A shows an enlarged schematic cross-sectional view of a draining device that may be used in exterior aircraft lights according to exemplary embodiments of the invention.
Figure 4B:
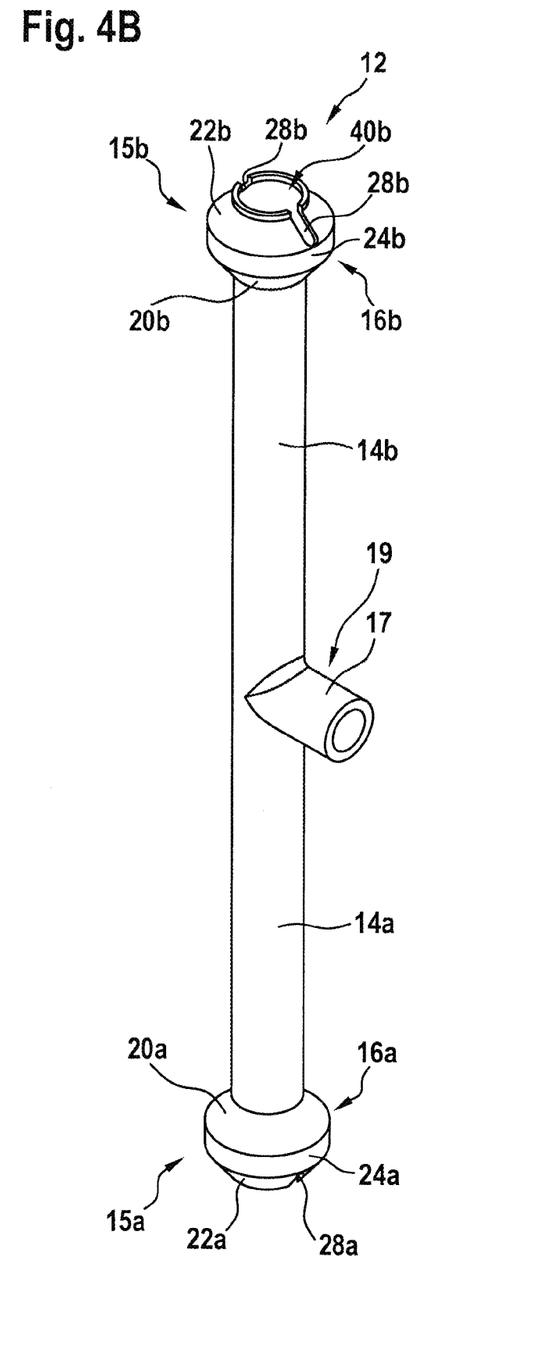
FIG. 4B shows a perspective view of the draining device depicted in FIG. 4A.

FIG. 4A shows an enlarged schematic cross-sectional view of a draining device 12 that may be employed in an exterior aircraft light according to an exemplary embodiment of the invention. In particular, the draining device 12 of FIG. 4A may be used as the draining device 12 of the exterior aircraft light 1 of FIG. 3. FIG. 4B shows a perspective view of the draining device 12 depicted in FIG. 4A.

The draining device 12 comprises a first drainage tube 14a, a second drainage tube 14b, and a fluid discharge port 19. The fluid discharge port 19 is in fluid communication with the first drainage tube 14a and the second drainage tube 14b.

In the exemplary embodiment depicted in FIGS. 3 and 4, the fluid discharge port 19 is provided at a central portion of the draining device 12 between the first and second drainage tubes 14a, 14b, and the first and second drainage tubes 14a, 14b extend downwards and upwards from said central portion, respectively.

The first and second drainage tubes 14a, 14b are configured for receiving fluid 26, in particular condensing water, which is to be drained from the interior space 9 of the housing 8, and for discharging said fluid 26 via the fluid discharge port 19 out of the housing 8.

FIGS. 3A and 3B illustrate that the first and second drainage tubes 14a, 14b do not simultaneously receive fluid 26 from the interior space 9. Depending on the spatial orientation of the exterior aircraft light 1, only one of the first and second drainage tubes 14a, 14b is immersed in the fluid 26 collected in the low portion 11 of the interior space 9, whereas the other one of the first and second drainage tubes 14a, 14b extends into an upper portion 21 of the interior space 9, in which no fluid 26 is present.

The fluid discharge port 19 may comprise a discharge tube 17. The discharge tube 17 may in particular be oriented substantially orthogonal to the first drainage tube 14a and/or to the second drainage tube 14b. A conduit or hose, which is not shown in the figures, may be fluidly coupled to the fluid discharge port 19 and/or to the discharge tube 17.

Each drainage tube 14a, 14b has a length La, Lb, which is measured from the central portion of the draining device 12 to an outer end of the respective drainage tube 14a, 14b. The lengths La, Lb may be in the range of between 20 mm and 120 mm.

The first and second drainage tubes 14a, 14b may have the same or a comparable length La, Lb. It is also possible that the first and second drainage tubes 14a, 14b have different lengths La, Lb. The lengths La, Lb may, inter alia, depend on where a convenient location for the fluid discharge port 19 and/or for the discharge tube 17 is.

The orientations and lengths La, Lb of the drainage tubes 14a, 14b may in particular be set so that in every orientation, in which the exterior aircraft light 1 may be mounted to the aircraft 100, one of the drainage tubes 14a, 14b extends towards the lowest portion of the interior space 9 for receiving fluid 26, in particular condensing water, collected at said lowest portion of the interior space 9. The respective drainage tube 14a, 14b may in particular extend substantially vertically towards the lowest portion of the interior space 9.

The drainage tubes 14a, 14b may have an inner diameter D1 in the range of between 2 mm and 15 mm, in particular an inner diameter D1 in the range of between 4 mm and 10 mm, more particularly an inner diameter D1 of between 5 mm and 8 mm.

The fluid discharge port 19 may be fluidly coupled via a duct, conduit or hose, which is not shown in the figures, to the environment outside the aircraft 100. A fluid connection between the interior space 9 and the environment outside of the aircraft 100 is provided, with the fluid connection allowing the draining device 12 to discharge the fluid 26 out of the interior space 9 into the environment outside the aircraft 100. The discharge tube 17 of the fluid discharge port 19 may also be in direct fluid communication with the environment outside the aircraft 100.

Each of the first and second drainage tubes 14a, 14b comprises a respective valve mechanism 15a, 15b. Enlarged perspective views of the valve mechanisms 15a, 15b are depicted in FIGS. 5A and 5B, which are jointly also referred to as FIG. 5 herein.

Figure 5A:
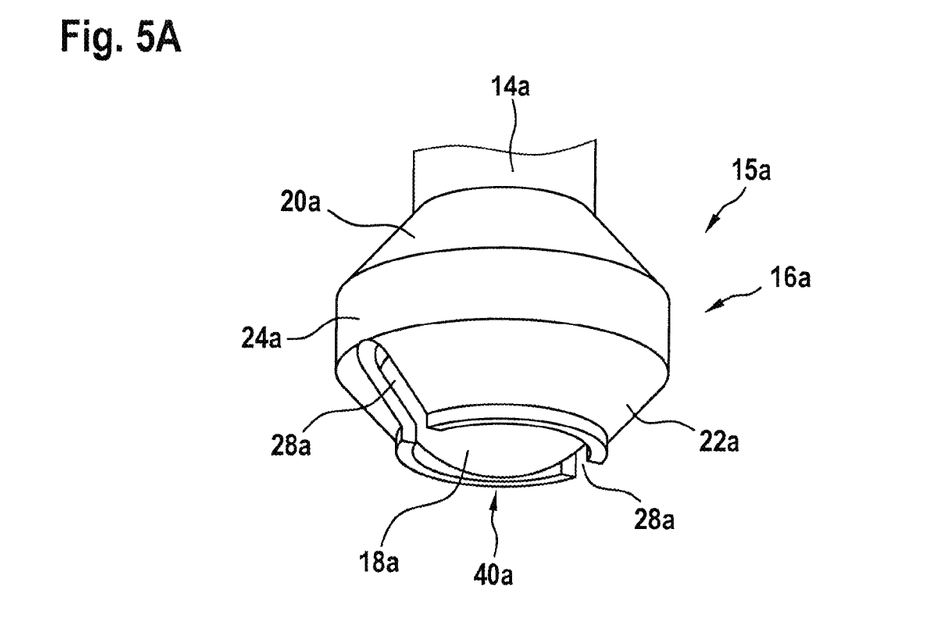
FIG. 5A shows an enlarged perspective view of a valve mechanism of the draining device, as depicted in FIGS. 4A and 4B, in a draining orientation.
Figure 5B:
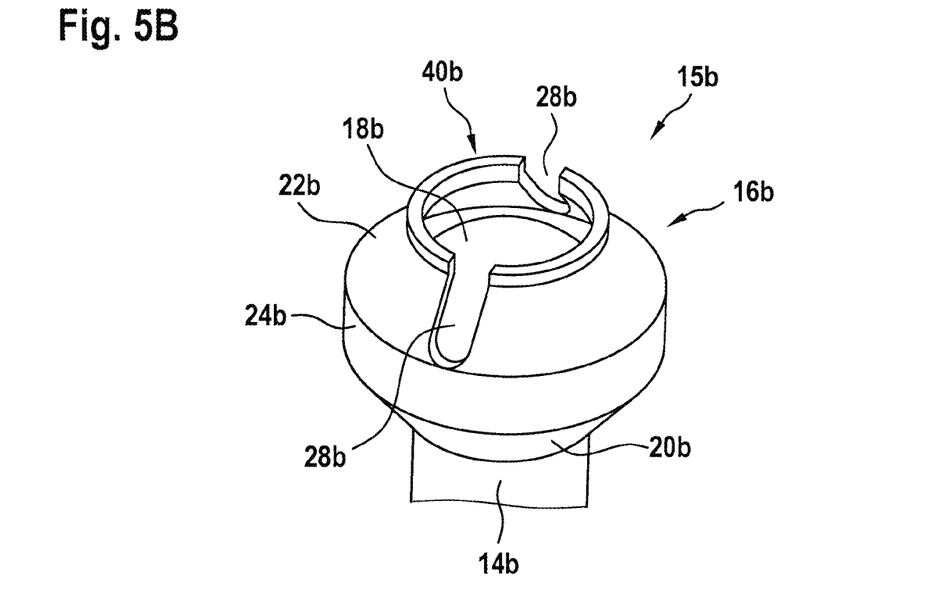
FIG. 5B shows an enlarged perspective view of a valve mechanism of the draining device, as depicted in FIGS. 4A and 4B, in a sealing orientation.

In the exemplary embodiment depicted in FIGS. 3 to 5, each valve mechanism 15a, 15b is located at an outer end portion of the respective drainage tube 14a, 14b, i.e. at an end portion of the respective drainage tube 14a, 14b that is distal from the central portion of the draining device 12.

Each valve mechanism 15a, 15b comprises a respective valve portion 16a, 16b and a respective sealing element 18a, 18b, for example a sealing ball, which is movably arranged within the valve portion 16a, 16b of the respective drainage tube 14a, 14b. Each sealing element 18a, 18b is in particular movable in the respective valve portion 16a, 16b under the influence of gravity.

The valve portions 16a, 16b may be provided as sections of the respective drainage tubes 14a, 14b. The valve portions 16a, 16b may in particular be formed integrally with the drainage tubes 14a, 14b.

Alternatively, the valve portions 16a, 16b may be formed separately from the drainage tubes 14a, 14b and may then be attached to the drainage tubes 14a, 14b.

The valve portions 16a, 16b and the corresponding sealing elements 18a, 18b are shaped and dimensioned such that each sealing element 18a, 18b, driven by gravity, opens the respective drainage tube 14a, 14b, allowing fluid 26 to pass through, when the respective drainage tube 14a, 14b is oriented in a draining orientation. When oriented in the draining orientation, the respective drainage tube 14a, 14b extends downwards from the central portion of the draining device 12.

In the orientation of the draining device 12 depicted in FIGS. 3A and 4, the first drainage tube 14a is oriented in the draining orientation and extends downwards into a low portion of the interior space 9. FIG. 5A shows the valve mechanism 15a of said first drainage tube 14a, when oriented in the draining orientation.

Each valve portion 16a, 16b and the corresponding sealing element 18a, 18b are further shaped and dimensioned such that the sealing element 18a, 18b, driven by gravity, seals the respective drainage tube 14a, 14b in an air-tight manner, when the respective drainage tube 14a, 14b is oriented in a sealing orientation. When oriented in the sealing orientation, the respective drainage tube 14a, 14b extends upwards from the central portion of the draining device 12.

In the orientation of the draining device 12 depicted in FIGS. 3A and 4, the second drainage tube 14b is oriented in the sealing orientation and extends upwards into an upper portion 21 of the interior space 9. FIG. 5B shows the valve mechanism 15b of said second drainage tube 14b, when oriented in the draining orientation.

In the alternative orientation of the draining device 12 depicted in FIG. 3B, the first drainage tube 14a is oriented in the sealing orientation, in which it extends upwards into the upper portion 21 of the interior space 9, and the second drainage tube 14b is oriented in the draining orientation, in which it extends downwards into the low portion 11 of the interior space 9.

In the embodiment depicted in FIGS. 3 and 4, the drainage tubes 14a, 14b are oriented at an angle $\alpha$ of 180° with respect to each other and at an angle $\beta$ of 90° with respect to the discharge tube 17. This corresponds to the two different orientations in which the exterior aircraft light 1 may be mounted to the aircraft 100, as it is depicted in FIGS. 2 and 3.

In further embodiments, which are not explicitly shown in the figures, the drainage tubes 14a, 14b may be oriented with respect to each other at different angles, i.e. at angles other than 180°. In such other embodiments, the drainage tubes 14a, 14b are also oriented at angles $\alpha$ that cause the sealing element in the valve portion of the upper drainage tube to seal, driven by gravity, the upper drainage tube in an air-tight manner and that cause the sealing element in the valve portion of the lower drainage tube to open, driven by gravity, the valve mechanism for allowing fluid 26 to pass through.

The first and second drainage tubes 14a, 14b may, for example, be oriented at an angle $\alpha$ of between 150° and 180° with respect to each other. The first and second drainage tubes 14a, 14b may, in particular, be oriented at an angle $\alpha$ of between 170° and 180° with respect to each other.

In the exemplary embodiment depicted in FIGS. 3 and 4, the drainage tubes 14a, 14b and the discharge tube 17 extend in a common plane, which corresponds to the drawing plane of FIGS. 3 and 4A. Different geometries of the draining device 12, in particular geometries in which the drainage tubes 14a, 14b and the discharge tube 17 do not extend in a common plane, are possible as well.

Each valve portion 16a, 16b comprises a radially extended portion, with a maximum inner diameter D2 of the radially extended portion being larger than the inner diameter D1 of the rest of the respective drainage tube 14a, 14b.

The valve portion 16a, 16b may have a maximum inner diameter D2 in the range of between 5 mm and 20 mm, in particular a maximum inner diameter D2 in the range of between 10 mm and 15 mm.

In the embodiment depicted in FIGS. 3 to 5, each valve portion 16a, 16b comprises an inner conical portion 20a, 20b and an outer conical portion 22a, 22b, respectively. The inner conical portion 20a, 20b and the outer conical portion 22a, 22b both have a conical shape.

Each inner conical portion 20a, 20b has an inner end with a first diameter and an outer end with a second diameter that is larger than the first diameter. The inner end of each inner conical portion 20a, 20b faces towards the central portion of the draining device 12, and the outer end of each inner conical portion 20a, 20b faces away from the central portion of the draining device 12. In other words, each inner conical portion 20a, 20b opens up towards the outer end of the respective drainage tube 14a, 14b, i.e. towards the end of the drainage tube 14a, 14b facing away from the central portion of the draining device 12.

The smaller diameter at the inner end of the inner conical portion 20a, 20b may in particular be identical with the inner diameter D1 of the respective drainage tube 14a, 14b.

Each outer conical portion 22a, 22b has an inner end with a first diameter and an outer end with a second diameter that is smaller than the first diameter. The inner end of each outer conical portion 22a, 22b faces towards the central portion of the draining device 12, and the outer end of each outer conical portion 22a, 22b faces away from the central portion of the draining device 12. In other words, the outer conical portions 22a, 22b open up towards the central portion of the draining device 12.

A central opening 40a, 40b is formed at the outer end of each outer conical portion 22a, 22b, respectively.

In the embodiment depicted in FIGS. 3 to 5, the second diameter at the outer end of the inner conical portion 20a, 20b is identical to the first diameter at the inner end of the outer conical portion 22a, 22b. The second diameter at the outer end of the inner conical portion 20a, 20b and the first diameter at the inner end of the outer conical portion 22a, 22b are in particular identical to the maximum inner diameter D2 of the valve portion 16a, 16b.

An intermediate portion 24a, 24b, having a cylindrical shape, extends between the outer end of the inner conical portion 20a, 20b and the inner end of the outer conical portion 22a, 22b.

In combination, the inner conical portion 20a, 20b, the intermediate portion 24a, 24b, and the outer conical portion 22a, 22b define a sealing element accommodation space for accommodating the sealing element 18a, 18b, with the sealing element 18a, 18b being movable within said sealing element accommodation space.

The outer conical portion 22a, 22b and the sealing element 18a, 18b are shaped and dimensioned such that the sealing element 18a, 18b, driven by gravity, opens the respective drainage tube 14a, 14b and allows fluid 26 to pass through, when the respective drainage tube 14a, 14b is oriented in the draining orientation, as is the first drainage tube 14a shown in FIGS. 3A, 4, and 5A.

The inner conical portion 20a, 20b and the sealing element 18a, 18b are shaped and dimensioned such that each sealing element 18a, 18b, driven by gravity, seals the respective drainage tube 14a, 14b in an air-tight manner, when the respective drainage tube 14a, 14b is oriented in the sealing orientation, as is the second drainage tube 14b shown in FIGS. 3A, 4 and 5B.

The outer conical portions 22a, 22b further provide a retainer structure, preventing the respective sealing element 18a, 18b from dropping out of the respective valve portion 16a, 16b, when the respective drainage tube 14a, 14b is oriented in the draining orientation.

At least one drainage port 28a, 28b may be formed in each valve portion 16a, 16b, respectively. The at least one drainage port 28a, 28b provides for fluid communication between the interior space 9 and the respective drainage tube 14a, 14b, when the respective drainage tube 14a, 14b is oriented in the draining orientation and the corresponding valve mechanism 15a, 15b is open.

The at least one drainage port 28a, 28b may in particular be formed in the outer conical portion 22a, 22b of the valve portion 16a, 16b.

In the embodiment depicted in FIGS. 4 and 5, two drainage ports 28a, 28b are provided in the form of two slits, which are formed in the outer conical portion 22a, 22b of each valve portion 16a, 16b. The two slits are formed at an angular distance of 180° degrees from each other along the circumference of the respective outer conical portion 22a, 22b. The slits also allow the outer conical portion 22a, 22b to elastically expand in the radial direction, when the respective sealing element 18a, 18b sits in the central opening 40a, 40b of the respective outer conical portion 22a, 22b.

Although two drainage ports 28a, 28b are depicted in FIGS. 4B and 5, more or less than two drainage ports 28a, 28b may be formed in each of the valve portions 16a, 16b, respectively.

In further embodiments, which are not explicitly shown in the figures, the drainage ports 28a, 28b may include one or more drainage holes. Such drainage holes may be formed in the outer conical portions 22a, 22b and/or in the intermediate portions 24a, 24b of the valve portion 16a, 16b, respectively. The drainage holes may be provided in addition to or as an alternative to the slits described above.

Figure 6:
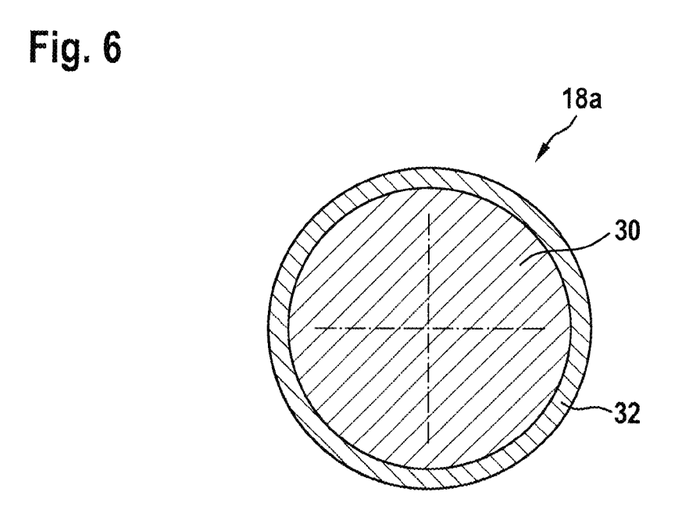
FIG. 6 depicts a cross-sectional view of a sealing element that may be used in exterior aircraft lights according to exemplary embodiments of the invention.

FIG. 6 depicts a cross-sectional view of a sealing element 18a that may be used in exterior aircraft lights according to exemplary embodiments of the invention. The sealing element 18a may in particular be used in an exterior aircraft light as depicted in FIGS. 3 to 5. The sealing element 18a, as depicted in FIG. 6, comprises a ball 30, which is covered with a coating 32.

The ball 30 may be made of metal, of rubber, or of a synthetic material. The ball 30 may also be made of a combination of a metal, rubber, and/or a synthetic material.

The material of the ball 30 may be selected so that the weight of the sealing element 18a is large enough for the sealing element 18a to seal the corresponding drainage tube 14a, 14b in an air-tight manner, when the sealing element 18a is driven by gravity towards the inner conical portion 20a, 20b of the respective valve mechanism 15a, 15b.

The coating 32 may be an elastic coating 32, in particular a rubber coating 32, for enhancing the sealing capabilities of the sealing element 18a. The coating 32 is, however, optional. Thus, it is possible that the sealing element 18a is not coated with a coating 32.

Figure 7:
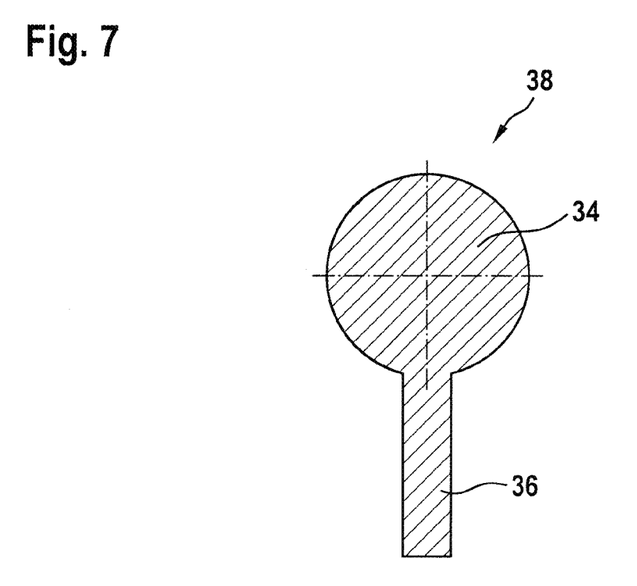
FIG. 7 depicts a cross-sectional view of another sealing element that may be used in exterior aircraft lights according to exemplary embodiments of the invention.

FIG. 7 depicts a cross-sectional view of a sealing element 38 that may be used in exterior aircraft lights according to other exemplary embodiments of the invention. The sealing element 38, depicted in FIG. 7, comprises a ball portion 34 and a rod 36, extending from the ball portion 34.

The rod portion 36 may extend from the ball portion 34 in a radial direction, as it is depicted in FIG. 7. The rod portion 36 may in particular be configured to extend into the respective drainage tube 14a, 14b, when the sealing element 38 is arranged within the valve portion 16a, 16b of the respective drainage tube 14a, 14b. In such a configuration, the rod portion 36 may guide the movement of the sealing element 38 between a sealed position and an open position. The rod portion 36 may further add weight to the sealing element 38, thus enhancing the sealing capabilities of the sealing element 38.

The ball portion 34 and the rod portion 36 may comprise the same material, or they may be made from different materials. Such materials may include metal, rubber, and/or synthetic materials.

The ball portion 34 and the rod portion 36 may be formed integrally. Alternatively, the rod portion 36 and the ball portion 34 may be manufactured separately and may then be joined with each other.

The rod portion 36 may be glued, soldered or welded to the ball portion 34. Alternatively, the ball portion 34 and the rod portion 36 may be provided with matching threads, which allow for screwing the rod portion 36 to the ball portion 34.

Similar to the embodiment depicted in FIG. 6, at least one of the ball portion 34 and the rod portion 36 may be at least partially coated with a coating 32, which is not shown in FIG. 7. The coating 32 may comprise rubber or another elastic material, in particular an elastic synthetic material.

In the following, the operation of a draining device 12 according to an exemplary embodiment of the invention is described:

When the aircraft 100, to which an exterior aircraft light 1 according to an exemplary embodiment of the invention is mounted, rises into the air and gains altitude, the air pressure outside the aircraft 100 decreases with increasing height of the aircraft 100. This results in an increasing pressure difference between the higher pressure within the interior space 9 and the decreasing pressure outside the aircraft 100.

Due to gravity acting upon the sealing elements 18a, 18b, which are movably arranged within the valve portions 16a, 16b of the valve mechanisms 15a, 15b provided at the drainage tubes 14a, 14b, the sealing element 18a within the valve portion 16a of the first drainage tube 14a, which in the embodiments depicted in FIGS. 3A, 4, and 5A is oriented in the draining orientation and extends downwards from the central portion of the draining device 12 into a low portion of the interior space 9 of the housing 8, drops into the outer conical portion 22a of the valve portion 16a. This opens the valve mechanism 15a, allowing fluid 26, which is collected within the interior space 9 of the housing 8, to pass through the valve mechanism 15a and to enter into the first drainage tube 14a.

The sealing element 18b within the valve portion 16b of the valve mechanism 15b of the second drainage tube 14b, which in the embodiments depicted in FIGS. 3A, 4, and 5 is oriented in the sealing orientation and extends upwards from the central portion of the draining device 12 into the upper portion 21 of the interior space 9, drops into the inner conical portion 20b of the valve mechanism 15b at the end of the second drainage tube 14b, sealing the second drainage tube 14b in an air-tight manner.

In the alternative orientation of the exterior aircraft light 1 depicted in FIG. 3B, the second valve mechanism 15b of the second drainage tube 14b, which faces downwards towards the light output generation unit 3 and into the low portion of the interior space 9, opens, allowing the fluid 26 to pass through; and the first valve mechanism 15a of the first drainage tube 14a, which faces upwards away from the light output generation unit 3, is sealed in an air-tight manner.

In an exterior aircraft light 1 according to an exemplary embodiment of the invention, since the upper one of the valve mechanisms 15a, 15b, which is not immersed in the fluid 26, is sealed in an air-tight manner, the pressure difference between the interior space 9 and the environment of the aircraft 100 may equalize only via the lower valve mechanism 15a, 15b, i.e. via that valve mechanism that may be immersed within the fluid 26.

In consequence, the pressure difference between the interior space 9 and the environment of the aircraft 100 drives the fluid 26, collected at the low portion 11 of the interior space 9, via the lower valve mechanism 15a, 15b into the respective lower drainage tube 14a, 14b and via the fluid discharge port 19 out of the aircraft 100. As a result, the interior space 9, formed within the housing 8, is drained, with said draining being driven by the pressure difference between the interior space 9 and the environment of the aircraft 100.

Sealing the upper drainage tube 14a, 14b, i.e. the drainage tube 14a, 14b that is not immersed within the fluid 26, in an air-tight manner prevents the pressure difference from equalizing through the upper drainage tube 14a, 14b, without driving the fluid 26 out of the interior space 9.

An exterior aircraft light 1 according to an exemplary embodiment of the present invention ensures that, independently of the orientation in which the exterior aircraft light 1 is mounted to the aircraft 100, the valve mechanism 15a, 15b of the upper drainage tube 14a, 14b, which is not immersed in the fluid 26, is sealed in an air-tight manner, and the valve mechanism 15a, 15b of the lower drainage tube 14a, 14b, which extends into the low portion 11 of the interior space 9, is open, allowing fluid 26 collected in a low portion 11 of the interior space 9 to pass therethrough.

In consequence, the draining device 12 of an exterior aircraft light 1 according to an exemplary embodiment of the invention may allow for reliably and effectively draining fluid 26 out of a housing 8 of the exterior aircraft light 1, irrespective of the orientation in which the exterior aircraft light 1 is mounted to the aircraft 100.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed, but that the invention will include all embodiments falling within the scope of the appended claims.

The invention claimed is:

1. An exterior aircraft light, comprising:
   a housing defining an interior space;
   a light output generation unit comprising at least one light source;
   power supply electronics, coupled to the light output generation unit for driving a light output of the exterior aircraft light;
      wherein at least one of the light output generation unit and the power supply electronics is arranged within the interior space; and
   a draining device for draining the interior space, the draining device comprising:

a first drainage tube for receiving fluid, which is to be drained from the interior space;
a second drainage tube for receiving fluid, which is to be drained from the interior space; and
a fluid discharge port for discharging fluid out of the housing, wherein the fluid discharge port is in fluid communication with the first drainage tube and with the second drainage tube;
wherein each of the first drainage tube and the second drainage tube comprises a valve mechanism for selectively sealing and opening the respective drainage tube with respect to the interior space, each valve mechanism comprising:
a valve portion of the respective drainage tube; and
a sealing element, in particular a sealing ball, arranged in the valve portion of the respective drainage tube,
wherein the sealing element is movable in the valve portion under the influence of gravity;
wherein the valve portion and the sealing element are shaped and dimensioned such that the sealing element, driven by gravity, opens the respective drainage tube, when the respective drainage tube is oriented in a draining orientation; and
wherein the valve portion and the sealing element are shaped and dimensioned such that the sealing element, driven by gravity, seals the respective drainage tube in an air-tight manner, when the respective drainage tube is oriented in a sealing orientation.

2. The exterior aircraft light according to claim 1,
wherein the draining orientation is a downward orientation, in which the respective drainage tube extends from the fluid discharge port into a low portion of the interior space; and
wherein the sealing orientation is an upward orientation, in which the respective drainage tube extends from the fluid discharge port into an upper portion of the interior space;
wherein the first drainage tube and the second drainage tube are in particular oriented at an angle ($\alpha$) of between 150° and 180° with respect to each other, wherein the first drainage tube and the second drainage tube are more in particular oriented at an angle ($\alpha$) of between 170° and 180° with respect to each other.

3. The exterior aircraft light according to claim 1, wherein the valve portion comprises a radially extended portion, with a diameter of the radially extended portion being larger than a diameter of the rest of the respective drainage tube.

4. The exterior aircraft light according to claim 1, wherein the valve portion comprises an inner conical portion, wherein the inner conical portion is in particular dimensioned for accommodating the sealing element in an air-tight manner, when the respective drainage tube is oriented in the sealing orientation.

5. The exterior aircraft light according to claim 4, wherein the valve portion further comprises an outer conical portion, wherein the inner conical portion and the outer conical portion face each other, forming a sealing element accommodation space for accommodating the sealing element, with the sealing element being movable between the inner conical portion and the outer conical portion.

6. The exterior aircraft light according to claim 1, wherein at least one drainage port, in particular at least one slit, is formed in the valve portion, in particular in an outer conical portion of the valve portion, wherein the at least one drainage port provides for fluid communication between the interior space and the respective drainage tube, when the respective drainage tube is oriented in the draining orientation.

7. The exterior aircraft light according to claim 1,
wherein the first and second drainage tubes have an inner diameter (D) in the range of between 2 mm and 10 mm, in particular an inner diameter (D) in the range of between 4 mm and 6 mm, more particularly an inner diameter (D) of about 5 mm; and/or
wherein the sealing element has an outer diameter (da) in the range of between 4 mm and 15 mm, in particular an outer diameter (da) in the range of between 6 mm and 10 mm, more particularly an outer diameter (da) of about 8 mm; and/or
wherein the sealing element has a weight in the range of between 3 g and 15 g, in particular a weight in the range of between 8 g and 12 g, more particularly a weight of about 10 g.

8. The exterior aircraft light according to claim 1,
wherein the sealing element comprises a metal ball, wherein the sealing element in particular comprises a metal ball covered with a coating, in particular with an elastic coating, such as a rubber coating; and/or
wherein the sealing element comprises a ball portion and a rod portion, extending from the ball portion, wherein the rod portion in particular extends into the respective drainage tube.

9. The exterior aircraft light according to claim 1, wherein the valve mechanism is arranged at an end portion of the respective drainage tube.

10. The exterior aircraft light according to claim 1, wherein the fluid discharge port comprises a discharge tube, wherein the discharge tube is in particular oriented substantially orthogonal to the first drainage tube and/or to the second drainage tube.

11. The exterior aircraft light according to claim 1,
wherein the exterior aircraft light is mountable to an aircraft in a first mounting orientation and in a second mounting orientation;
wherein the first drainage tube extends into a first portion of the interior space for receiving fluid from the first portion of the interior space, wherein the first portion is a low portion of the interior space, when the exterior aircraft light is in the first mounting orientation; and
wherein the second drainage tube extends into a second portion of the interior space for receiving fluid from the second portion of the interior space, wherein the second portion is a low portion of the interior space, when the exterior aircraft light is in the second mounting orientation.

12. The exterior aircraft light according to claim 1,
wherein the light output generation unit and the power supply electronics are arranged in the housing; or
wherein the power supply electronics are arranged in the housing and wherein the light output generation unit is arranged in a separate light head portion of the exterior aircraft light, which is arranged outside of the housing.

13. The exterior aircraft light according to claim 1,
wherein the exterior aircraft light is an aircraft headlight, such as an aircraft landing light or an aircraft take-off light or an aircraft taxi light or an aircraft runway turn-off light or a multi-functional aircraft headlight, which combines the functionalities of at least two of an aircraft landing light, an aircraft take-off light, an aircraft taxi light, and an aircraft runway turn-off light; or wherein the exterior aircraft light is an aircraft navigation light, in particular a wing-tip-mounted aircraft navigation light; or wherein the exterior aircraft light is a red-flashing aircraft beacon light, in particular a fuselage-mounted red-flashing aircraft beacon light.

14. An aircraft, such as an airplane or a helicopter, comprising at least one exterior aircraft light according to claim 1.

15. A method of draining a fluid out of the interior space of the housing of an exterior aircraft light according to claim 1, with the exterior aircraft light being mounted to an aircraft in a first mounting orientation, wherein the first drainage tube extends in its draining orientation into a low portion of the interior space, when the exterior aircraft light is mounted in its first mounting orientation to the aircraft, and wherein the method comprises the steps of:

when the aircraft is on the ground, with gravity acting upon the sealing elements, opening the valve mechanism of the first drainage tube and closing the valve mechanism of the second drainage tube;

taking off the aircraft and gaining altitude;

with a pressure difference between the interior space of the housing and an outside environment of the aircraft, driving the fluid through the valve mechanism of the first drainage tube and out of the housing.

* * * * *